(12) United States Patent
Fischer et al.

(10) Patent No.: US 8,997,798 B2
(45) Date of Patent: Apr. 7, 2015

(54) REFRIGERANT LINE

(75) Inventors: Dietmar Fischer, Cologne (DE);
Markus Markowitz, Cologne (DE);
Lambertus Wilhelmus Schmitz,
Cologne (DE)

(73) Assignee: Ford Global Technologies, LLC,
Dearborn, MI (US)

( * ) Notice: Subject to any disclaimer, the term of this patent is extended or adjusted under 35 U.S.C. 154(b) by 656 days.

(21) Appl. No.: 13/346,996

(22) Filed: Jan. 10, 2012

(65) Prior Publication Data

US 2012/0180897 A1    Jul. 19, 2012

(30) Foreign Application Priority Data

Jan. 19, 2011   (DE) .................. 10 2011 002 845

(51) Int. Cl.
*F16L 9/14*   (2006.01)
*B60H 1/00*   (2006.01)
*F24F 1/32*   (2011.01)

(52) U.S. Cl.
CPC .............. *F16L 9/14* (2013.01); *B60H 1/00571* (2013.01); *F24F 1/32* (2013.01)

(58) Field of Classification Search
CPC .................................................. B60H 1/00571
USPC ................................. 138/137, 141, 123–125; 428/36.1–36.91
See application file for complete search history.

(56) References Cited

U.S. PATENT DOCUMENTS

| 4,048,810 | A | * | 9/1977 | Zeilon | 62/101 |
| 4,102,783 | A | * | 7/1978 | Zenno et al. | 210/691 |
| 5,244,503 | A | * | 9/1993 | Fabian | 134/6 |
| 5,586,996 | A | * | 12/1996 | Manookian, Jr. | 55/321 |
| 6,613,131 | B2 | | 9/2003 | Ujita et al. | |
| 7,560,414 | B2 | * | 7/2009 | Schmitt et al. | 502/407 |
| 2002/0015603 | A1 | * | 2/2002 | Kimura et al. | 399/325 |
| 2007/0113912 | A1 | * | 5/2007 | Lawrence | 138/121 |

FOREIGN PATENT DOCUMENTS

| DE | 10359069 A1 | 7/2005 |
| DE | 102005007687 A1 | 8/2006 |
| JP | 08100935 A * | 4/1996 |

* cited by examiner

*Primary Examiner* — Patrick F Brinson
(74) *Attorney, Agent, or Firm* — Vichit Chea; Brooks Kushman P.C.

(57) ABSTRACT

A refrigerant line for carrying a mixture of refrigerant and lubrication oil. The line includes an inner casing made of a material impermeable to the refrigerant/oil mixture, an outer casing made of a material that is highly permeable to the refrigerant in its gaseous state, and an intermediate layer between the inner and outer casings made of a material that is high permeable to the gaseous refrigerant but that is able to retain the admixed oil. In this way, any oil contained in a refrigerant/oil mixture leaking through the inner casing is retained by the intermediate layer, while the refrigerant gas is allowed to escape through the outer two layers. The intermediate layer may retain the oil by absorption, by adsorption, or by binding of the oil.

5 Claims, 1 Drawing Sheet

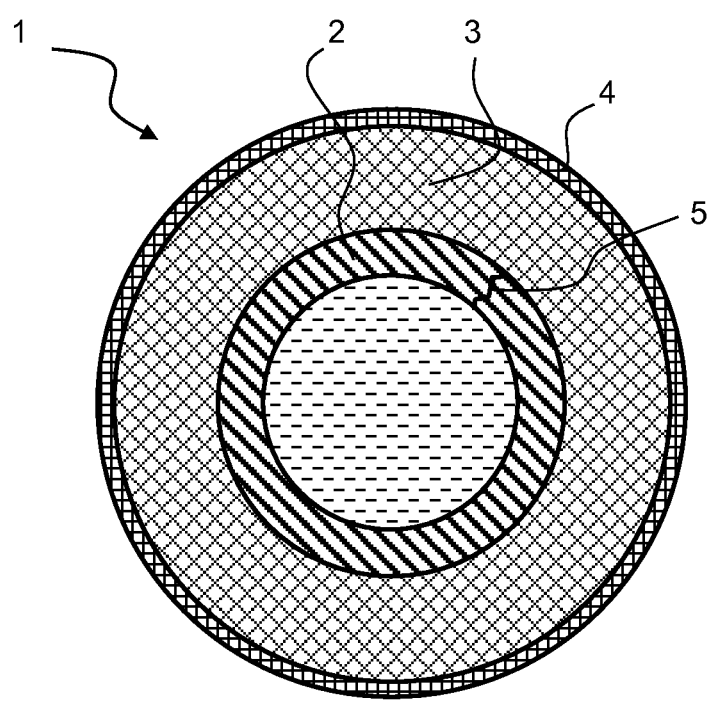

REFRIGERANT LINE

CROSS-REFERENCE TO RELATED APPLICATIONS

This application claims foreign priority benefits under 35 U.S.C. §119(a)-(d) to DE 10 2011 002845.5, filed Jan. 19, 2011, which is hereby incorporated by reference in its entirety.

TECHNICAL FIELD

The invention relates to a refrigerant line used in a vehicle air conditioning system and to a correspondingly configured vehicle air conditioning system.

BACKGROUND

In the refrigerant circuit of vehicle air conditioning systems, refrigerant undergoes changes of state in a closed circulatory process, for which purpose at least two heat exchangers are required. At a first heat exchanger (refrigerant cooler, refrigerant condenser), heat is extracted from the gaseous refrigerant (after it has been compressed and heated by a compressor), and at the second heat exchanger (evaporator) heat is supplied from outside to the refrigerant as it evaporates. Air flowing past the evaporator can thus be cooled and air flowing past the refrigerant condenser can be heated.

The air which is supplied to the passenger cabin for cooling or conditioning the latter is conducted to the evaporator, cooled there and then conducted into the passenger cabin. In this case, the evaporator is usually arranged in an air distributor duct connected to the outlet of a blower and leading into the passenger cabin, whereas the other components of the air conditioning system are accommodated outside the passenger cabin.

A certain fraction of oil is admixed to the refrigerant for the purpose of lubricating the compressor. In the event of leakage or damage to a component of the refrigerating circuit and/or to the refrigerant lines connected to the components, refrigerant and therefore the admixed oil may escape.

SUMMARY

In an embodiment disclosed herein, a refrigerant line for use in an air conditioning system comprises an inner casing made of a material impermeable to refrigerants and oil, an outer casing made of a material that is highly permeable to refrigerants in a gaseous state, and an intermediate layer between the inner and outer casings made of a material that is high permeable to refrigerants in a gaseous state but that is able to retain oil. In this way, any oil contained in a refrigerant/oil mixture leaking through the inner casing is retained by the intermediate layer, while the refrigerant gas is allowed to escape through the outer two layers.

In embodiments disclosed herein, the intermediate layer may retain the oil by absorption, by adsorption, or by binding of the oil.

In the event of a leak in the refrigerant circuit, the likelihood of emergence of the admixed oil, together with the refrigerant, is reduced or eliminated.

BRIEF DESCRIPTION OF THE DRAWINGS

Further details, features and advantages of the invention may be gathered from the following description of an exemplary embodiment on the basis of the following drawing:

FIG. 1 shows a diagrammatic cross section through a refrigerant line.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

In FIG. 1, the refrigerant line is designated as a whole by 1. It comprises, as seen in cross section from the inside outward, an inner casing 2 that is leak-tight in respect to a refrigerant/oil mixture of the type used in a vehicle air conditioning system, a gas-permeable and oil-retaining intermediate layer 3, and a gas-permeable outer casing 4.

The inner casing 2 serves as the actual refrigerant line in the normal state, that is to say without leakage, and, where appropriate, also performs a carrying function in addition to the refrigerant line function. It may be composed of known materials, such as metal, plastic or rubber. It may be of smooth or corrugated form.

The inner casing 2 is surrounded radially by the gas-permeable and oil-retaining intermediate layer 3. The intermediate layer 3 may be composed of gas-permeable oil-absorbing mineral granulate, for example. Finally, the outer sheathing forms the gas-permeable outer casing 4 which in turn surrounds the layer 3.

The intermediate layer 3 can retain the oil by sorption (absorption and/or adsorption) and/or by binding via appropriate means.

Sorption is a collective designation for processes which lead to an enrichment of a substance within a phase or at an interface between two phases. Enrichment within a phase is referred to more specifically as absorption, and that occurring at the interface is referred to more specifically as adsorption.

Oil binding agents, also called oil binders, are used for binding ("sucking up") oils.

Examples of appropriate oil binding agents, Type I, as approved by the Association of Manufacturers of Tested Oil and Chemical Binding Agents, E. V. (German Registered Association), also come under consideration.

Examples of oil-retaining agents which can be used are oil binding fleece (for example, from 3M®), corn cob granulate, membranes (for example, U.S. Pat. No. 6,613,131) or knitted fabric separators (for example, DE 103 59 069 A1).

The intermediate layer 3 may advantageously be made from a material having a low flammability, and is preferably noncombustible.

In the normal state, the refrigerant/oil mixture flows through the refrigerant line 1 inside the inner casing 2. If a leakage, indicated at 5, occurs in the inner casing 2, the refrigerant/oil mixture emerges. In this case, the oil fraction of the refrigerant/oil mixture is bound by the intermediate layer 3 and the refrigerant can escape through this layer 3 and the outer casing 4 in a gaseous state, if appropriate after it has expanded. This effectively prevents oil from emerging from the refrigerant line 1 and escaping into the surrounding environment.

Since the refrigerant line of a vehicle air conditioning system is equipped with an inner leak-tight casing, an outer gas-permeable casing, and a gas-permeable and oil-retaining layer between the inner and the outer casing, in the event of a leakage the refrigerant/oil mixture may escape from the leak in a controlled way, in which case the refrigerant can escape in the form of gas through the intermediate layer and the outer casing and the oil is retained in the intermediate layer.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A line for carrying a refrigerant/oil mixture, comprising:
   an inner tube made of a first material impermeable to refrigerants and oil;
   an outer casing made of a second material having a high permeability to refrigerants in a gaseous state; and
   an intermediate layer between the inner tube and the outer casing made of a third material having a high permeability to refrigerants in a gaseous state, and further able to retain oil.

2. The refrigerant line of claim 1, wherein the intermediate layer comprises an oil absorbent material.

3. The refrigerant line of claim 1, wherein the intermediate layer comprises an oil adsorbent material.

4. The refrigerant line of claim 1, wherein the intermediate layer comprises an oil binding agent.

5. The refrigerant line of claim 1, wherein the material of the intermediate layer has a low flammability.

\* \* \* \* \*